United States Patent
Marilly et al.

(10) Patent No.: US 10,757,063 B2
(45) Date of Patent: Aug. 25, 2020

(54) METHOD FOR SELECTING SECOND MESSAGES FOR ONLINE INSERTING SAID SECOND MESSAGES IN SOCIAL NETWORK CONTENT

(71) Applicant: Alcatel Lucent, Nozay (FR)

(72) Inventors: Emmanuel Marilly, Nozay (FR); Alonso Silva Allende, Nozay (FR); Gérard Burnside, Nozay (FR)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/327,171

(22) PCT Filed: Aug. 22, 2017

(86) PCT No.: PCT/EP2017/071128
§ 371 (c)(1),
(2) Date: Feb. 21, 2019

(87) PCT Pub. No.: WO2018/037006
PCT Pub. Date: Mar. 1, 2018

(65) Prior Publication Data
US 2020/0120059 A1 Apr. 16, 2020

(30) Foreign Application Priority Data
Aug. 23, 2016 (EP) .................................. 16306074

(51) Int. Cl.
*H04L 12/58* (2006.01)
*G06F 16/9535* (2019.01)
(Continued)

(52) U.S. Cl.
CPC .......... *H04L 51/32* (2013.01); *G06F 16/9535* (2019.01); *G06Q 10/10* (2013.01);
(Continued)

(58) Field of Classification Search
CPC ....... H04L 51/32; H04L 67/306; H04L 51/16; G06Q 10/10; G06Q 50/01; G06F 16/9535
See application file for complete search history.

(56) References Cited

U.S. PATENT DOCUMENTS

2012/0221656 A1 8/2012 Cai et al.
2012/0254184 A1 10/2012 Choudhary et al.
(Continued)

OTHER PUBLICATIONS

International Search Report and Written Opinion mailed in corresponding PCT/EP2017/071128 dated Mar. 1, 2018, 10 pages.

*Primary Examiner* — Kim T Nguyen
(74) *Attorney, Agent, or Firm* — Tong, Rea, Bentley & Kim, LLC (57) ABSTRACT

A method, system, and devices for online inserting messages in at least one social network content application of a plurality of social network content applications of at least one social network platform is described. The method includes collecting a plurality of social network messages originating from the plurality of social network content applications, determining a set of messages having a certain degree of similarity from the plurality of social network messages, by comparing each message with each further message of the plurality of message, extracting a topic from the plurality of social network messages included in the set of messages having at least the certain degree of similarity, and determining a second certain degree of similarity between the topic and an second message of a plurality of second messages based on the degree of similarity between respective suffix trees corresponding to each message of the messages.

18 Claims, 4 Drawing Sheets

(51) Int. Cl.
*G06Q 10/10* (2012.01)
*G06Q 50/00* (2012.01)
*H04L 29/08* (2006.01)

(52) U.S. Cl.
CPC ............ *G06Q 50/01* (2013.01); *H04L 51/16* (2013.01); *H04L 67/306* (2013.01)

(56) References Cited

U.S. PATENT DOCUMENTS

2015/0281163 A1* 10/2015 Bastide .................. G06Q 10/10
 709/206
2016/0014151 A1* 1/2016 Prakash .............. H04L 63/1483
 726/22
2019/0273708 A1* 9/2019 Vellal ...................... H04L 51/22

* cited by examiner

Algorithm 1 Topic detection based on Joint Complexity

```
// N = # timeslots, M = # tweets in the n-th timeslot
for n = 1 to N do
    for t = 1 to M do
        t ← t_json.getText();
        t_ST ← suffixTreeConstruction(t);
        JCScores ← NormalizedJCMetric();
    end for
    // Find the most central tweets by summing its score with all other tweets
    S^n ← sum(JCScores);
    // Sort by sum and the central tweets are at the top
    R^n ← descendingOrder(S^n);
    Topics ← {};
    // Group the tweets into topics
    for t = 1 to M do
        t ← R^n.popElement();
        for topic in Topics do
            if JCScore[t,topic] isGreaterThan threshold then
                topic.attachRelated(t);
            end if
        end for
        if t was not attached to any topic then
            Topics.add(t);
        end if
    end for
end for
```

METHOD FOR SELECTING SECOND MESSAGES FOR ONLINE INSERTING SAID SECOND MESSAGES IN SOCIAL NETWORK CONTENT

CROSS-REFERENCE TO RELATED APPLICATIONS

This application is based on and claims the benefit of International Patent Application No. PCT/EP2017/071128, filed on Aug. 22, 2017, which claims priority to European Patent Application No. 16306074.2, filed on Aug. 23, 2016, both of which are hereby incorporated herein by reference in their entirety.

FIELD OF THE INVENTION

The present invention relates to the field of presenting of social network content, and in particular to message insertion in social network content.

TECHNICAL BACKGROUND OF THE INVENTION

Presently, the number of solutions enabling to display information coming amongst others from social networks is increasing and they have become widely used. These solutions cover different areas such as digital signage (Tweet walls, Cisco digital signs, etc.), web or mobile phone applications (Netvibes, Flipboard, etc.). To monetize these applications, usually, online advertising services are provided that enable advertisers to buy brief advertising display on these screens or applications. These advertising services are mainly based on the Generalized Second Price auction, further referred to as GSP, where advertisers bid over predefined keywords. The choice of keywords, the mapping between keywords and targets, and the relevance of targets are often complex, not flexible and not adaptable.

In current applications such as Google AdsWord the insertion of second messages called advertisements, (provided by Google, are being based on keywords defined by advertisers. Advertisers define their keywords. When a Google end-user searches this or theses keywords e.g. in a browser, the second message called advertisement is shown or/is inserted in the application. Such system is limited in that advertisers have to provide predefined keywords whereas it is very difficult to know keywords' impact and have a clear visibility, in order to define targets precisely and measure their impact.

The match is done through keywords. Moreover, for the purpose of selection of keywords, Google provides a tool: KeyWords Planner (to get keywords ideas and traffic forecasts).

Additionally, in case of Twitter, it is provided with an insertion of second messages called online advertisements where the insertion of such second messages is based on interests, geography, gender, device and users similar to follower or keywords. Such second message provider like an advertiser has to select predefined fields for interest's selection or to enter keywords.

For keywords selection, indication of tweets number is given. Similarly to AdsWord, it is difficult to find the right keywords and to know if the selected keywords match the right population target.

Hence such systems and methods, and related devices are disadvantageous in that the second message insertion is based on keywords for which selected keywords it still is difficult (to plan to target the right population).

SUMMARY OF THE INVENTION

An objective of the present invention is to provide with a method, a system and related devices for online inserting messages in at least one social network content applications of a plurality of social network content applications of at least one social network platform, but wherein the aforementioned shortcoming or drawbacks of the known solutions are alleviated or overcome.

Accordingly, embodiments of the present invention relate to a method for online inserting or presenting messages in at least one social network content application of a plurality of social network content applications of at least one social network platform, said method comprising the steps of:

Collecting a plurality of social network messages originating from said plurality of social network applications, wherein said method further comprises the steps of:

Determining a set of messages having a certain degree of similarity from said plurality of said social network messages, by comparing each message $M_1$ with each further message $M_2 \ldots M_x$ of said plurality of messages; and extracting a topic from said plurality of social network messages originating from said plurality of social network applications included in said set of messages having at least a certain degree of similarity; and determining a second degree of similarity between said topic and a second message of a plurality of second, messages based on said second degree of similarity between respective suffix trees corresponding to each message of said messages; and inserting a second type of message of said plurality of second type of messages, corresponding to said topic, in said social network content applications.

Indeed in this way, by at first collecting a plurality of social network messages originating from a plurality of social network applications and thereafter determining a set of messages having a certain degree of similarity from said plurality of said social network messages collected, by comparing each message $M_1$ with each further message $M_2 \ldots M_x$ of said plurality of social network messages, for instance using a joint complexity approach, and subsequently extracting a topic from said plurality of social network messages originating from said plurality of social network applications included in said set of messages having at least a certain degree of similarity and further determining a second degree of similarity between said topic and a second, e.g. advertisement, message of a plurality of second messages based on said degree of similarity between respective suffix trees corresponding to each message of said messages, this method, corresponding system and devices are optimum configured to insert or present a second type of second, e.g. advertisement message of said plurality of second type of e.g. advertisement, messages in the social network content applications that optimum corresponds or matches the messages originating from the plurality of social network applications.

Hence, in this manner this system, method and related devices will provide the guarantee that the selected topic (groups of screens and accounts) is relevant to such a second message, e.g. an advertisement message.

By comparing each message $M_1$ with each further message $M_2 \ldots M_x$ of said plurality of social network messages in order to determine each further message having a at least a certain degree of similarity with the first message from said plurality of said social network messages collected e.g. using a joint complexity approach a set of social network messages is determined from the collected plurality of social network messages originating from a plurality of social network applications where the messages included in this set of messages has at least a certain degree of similarity with the first message.

Each social network message $M_1$ is compared with each further social network message $M_2 \ldots M_x$ of said plurality of social network messages in order to determine further social network messages having a certain degree of similarity with the first message. Each social network message from said plurality of said social network messages collected having a at least a certain degree of similarity with the first social network message e.g. by using a joint complexity approach, are combined into a set of social network messages from the collected plurality of social network messages originating from a plurality of social network applications.

The degree of similarity may be determined by means of comparing social network messages using a joint complexity approach wherein common factors of such messages are determined. Common factors indicate the degree of similarity of the texts.

Alternatively, the degree of similarity may be determined by means of well known algorithms or approaches, which are less efficient than the described methods, such as Lexical analysis, Latent Semantic Analysis, Lesk algorithms.

A message may be any kind of textual communication from or towards a social network application.

A second message may be any kind of advertisement or alternatively be a user help, assistance message or response in relationship with the category of message. The second message could be a trigger message to human assistant that will provide a response. A use case that is not advertising could be people talking about problems on a bus line, the second message is a triggering message to the bus owner and sending a message "we take into account your problem and we will try to solve it"

Further, a topic is extracted from a set of social network messages as determined by means of constructing the suffix trees of all the messages, then computing the similarity matrix of these messages by counting the number of common factors among each pair of trees and finally aggregating the tweets around central messages to form Topics, by selecting a threshold below which messages are no longer considered similar (Description of the method to detect Topics in Twitter messages is available here: G. Burnside, D. Milioris and P. Jacquet, "One Day in Twitter: Topic Detection Via Joint Complexity" in SNOW-DC@WWW 2014, pp. 41-48, 2014.). A suffix tree (also called PAT tree or, in an earner form, position tree) is a compressed tree containing all the suffixes of the given text as their keys and positions in the text as their values (https://en.wikipedia.org/wiki/Suffix_tree).

Additionally, once topics are extracted, a Tag cloud algorithm is applied to the set of messages owned by the topic in order to extract/give a representation of the topic which is understandable by a user. This representation for instance may be rendered at an interface destined for an advertiser or other instance for managing the insertion or presenting of second messages.

Now a topic represents a set of messages of the set of messages that is owned by the topic.

The determination of a topic from said plurality of social network messages originating from said plurality of social network applications included in said set of messages having at least a certain degree of similarity and further is performed by determining a second degree of similarity between said topic extracted and a second, e.g. advertisement, message of a plurality of second messages which is based on said second degree of similarity between respective suffix trees corresponding to each message of said second messages.

The Joint Complexity Topic Detection algorithm is applied to group messages into sets of messages each having a similar topic where different sets of messages do have different topics. Once all messages are allocated to a set of messages the Joint Complexity algorithm is applied to measure the similarity between the second messages, e.g. advertisements and topics.

The higher a degree of similarity is, between the ads and a topic, the higher the chance is that the matching is high meaning that there is a high resemblance.

Hence by first grouping a set of messages all having a certain similarity, meaning that messages of this set correspond to each other, further by determining at least a single topic for such set of messages, which topic represents the meaning of each message of the set of social network messages, where the extracted topic is optimum suited for determining a suitable and corresponding second message such as an advertisement message. Such optimum suited corresponding second message such as an advertisement message can be transmitted to each of the users that correspond to each message of the set of social network messages.

This embodiment of the present invention enables to smartly display advertising contents on user screens or applications based on an algorithm that is language agnostic, that does not require humans to deal with list of keywords and that has high algorithmic efficiency. A sender of second messages, in case of advertisements, the advertiser will have the guarantee to have the most efficient campaign through a perfect matching between its ads messages and topics discussions/exchanges done in social networks and displayed on user screens.

The present invention is advantageous in that the present invention is language agnostic and hence is applicable for large number of languages.There is as a consequence no need to define semantics or the use of a dictionnary, etc . . . as topics are discovered through the analysis of social networks messages exchanges. The matching between the ads messages and topics is done via the JC measurement (no keyword matching, but similarity measurement).

Further characterizing embodiments of the present method for are mentioned in the appended claims.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device a coupled to a device B' should not be limited to devices or systems wherein an output of device A is directly connected to an input of device B. This means that there exists a path between an output of A and an input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

Figure 1:
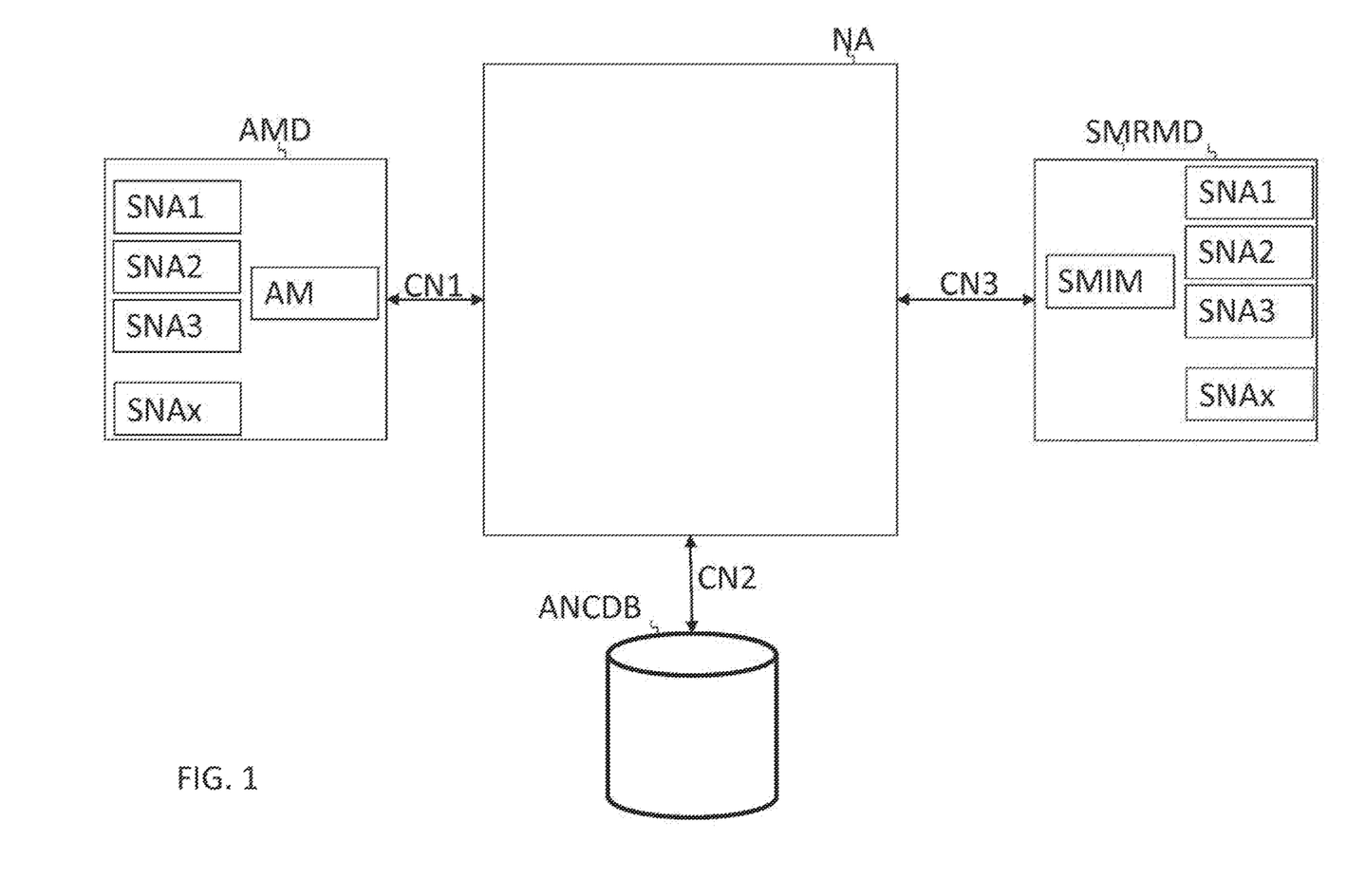
FIG. 1 represents a functional representation of a system for online inserting or presenting second messages in at least one social network content application wherein the system comprises a network apparatus, an aggregation module, and a second message presenting module SMRMD.
Figure 2:
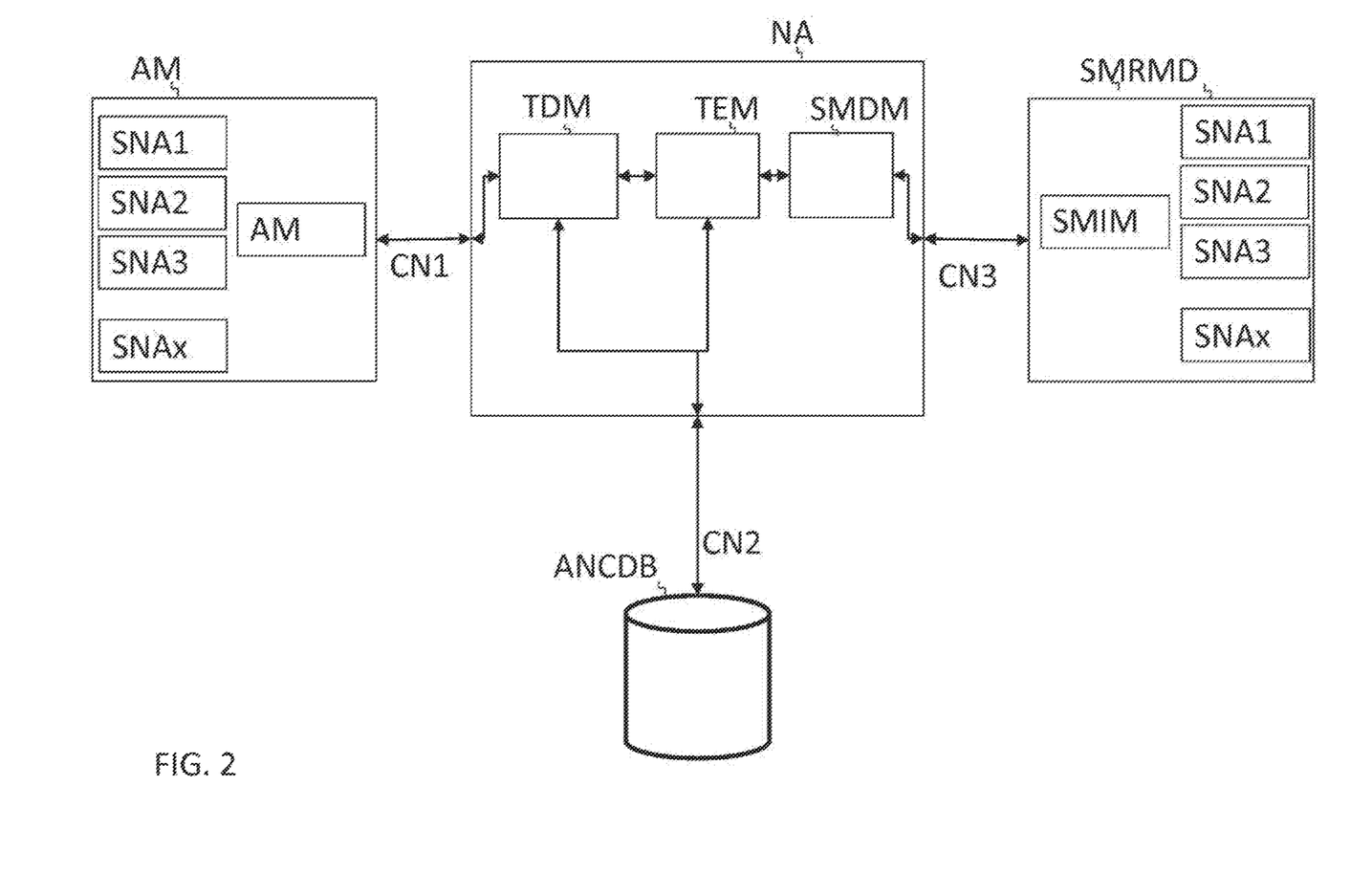
FIG. 2 represents the functional structure of the network apparatus of the system for online inserting second message as presented in FIG. 1.

In the following paragraphs, referring to the drawing in FIG. 1, an implementation of the system configured to select second messages for online inserting or presenting said messages in at least one social network content application of a plurality of social network content applications SNA1, . . . , SNAx, of at least one social network platform, wherein a plurality of social network messages originating from said plurality of social network applications SNA1, . . . , SNAx are collected according to an embodiment of the present invention is described. In a further paragraph, all connections between mentioned elements are defined. Subsequently all relevant functional means of the mentioned system as presented in FIG. 2 are described followed by a description of all interconnections.

In the succeeding paragraph the actual execution of the method configured to select second messages for online inserting or presenting said messages in at least one social network content application of a plurality of social network content applications, system is described.

A first element of the system is an aggregating module comprising an aggregation means AM that is configured to collect a plurality of social network messages originating from said plurality of social network applications SNA1, . . . , SNAx whereafter these messages are stored in an aggregated network content data base ANCDB. The aggregating module AMD is in charge of collecting the content coming from social networks (such as twitter, facebook, engage, jive, etc.) based on user configuration and/or interests. This module aggregates the content of different heterogeneous social networks. It manages the identification, registration, collecting based on user configuration and/or -inputs (e.g. user account id, user configuration, . . . ) and manages and/or optimizes also the social network constraints (e.g. limitation of requests, . . . ). Furthermore, the system comprises a network apparatus NA being a server device or alternatively being a virtual server device, databases, cluster of servers, micro services, agent, embedded agent in device/application/browser . . . that is configured to select second messages for online inserting or presenting said messages in at least one social network content application of a plurality of social network content applications SNA1, . . . , SNAx, of at least one social network platform, wherein a plurality of social network messages originating from said plurality of social network applications.

Furthermore, the system comprises a second message presenting module SMRMD, being a module that is integrated in the client device being the application part dedicated to the user screen where social networks message are displayed and ads messages dispatched or alternatively being integrated in messages streams which second message inserting module SMIM is configured to render the second messages which are selected by the network apparatus at client devices coupled to the respective social network platforms or servers.

Finally the system comprises an aggregated network content Database ANCDB being a single database or a distributed set of databases that is coupled to-, or integrated in the network apparatus and that is configured to store the social network content that is collected by the aggregating module AM which content may comprise a plurality of social network messages originating from said plurality of social network applications SNA1, . . . , SNAx. The content coming from social networks (such as twitter, facebook, engage, jive, etc.) may be based on user configuration and/or interests.

The aggregation module AM may be coupled to the network apparatus NA over a suitable communication network CN optionally containing a concatenation of an access network such as a digital subscriber line access network with coupled DSL modems or a cable network, a mobile communication access network with connected Smartphone or tablet devices or other suitable communications network and core internet network.

Alternatively, such aggregation module may be coupled to a social network platform or forms part of such social network platform.

Furthermore, the network apparatus NA may be coupled to the a second message inserting module SMIM over a over a suitable communication network CN3 optionally containing a concatenation of an access network such as a digital subscriber line access network with coupled DSL modems or a cable network, a mobile communication access network with connected Smartphone or tablet devices or other suitable communications network and core internet network.

Again, the aggregated network content Database ANCDB may be coupled to the network apparatus NA over a suitable communication network CN2 optionally containing a concatenation of an access network such as a digital subscriber line access network with coupled DSL modems or a cable network, a mobile communication access network with connected Smartphone or tablet devices or other suitable communications network and core internet network.

The network apparatus NA comprises a topic determination means TDM that is configured to determine a set of messages having a certain degree of similarity from said plurality of said social network messages, by comparing each message with each further message of said plurality of messages, e.g. by using a joint complexity approach, and a second message determination means SMDM that is configured to determine a second certain degree of similarity between said topic and an second, e.g. advertisement message of a plurality of second messages based on said degree of similarity between respective suffix trees corresponding to each message of said messages.

The network apparatus NA may further comprise an extracting means TEM that is configured to extract a topic from said plurality of social network messages originating from said plurality of social network applications included in said set of messages having at least a certain degree of similarity.

The topic determination means TDM has an input/output terminal that is at the same time an input of the network apparatus and is coupled to the extracting means TEM that in turn is coupled to the second message determination means SMDM having an output-terminal that is at the same time an input/output-terminal of the network apparatus. The topic determination means TDM further has an input/output terminal that is at the same time an input/output network apparatus NA coupling via to the communications network CN 3 to the aggregated network content data base ANCDB.

The extracting means TEM also has an input/output terminal that is at the same time an input/output network apparatus NA coupling via to the communications network CN 3 to the aggregated network content data base ANCDB.

In order to explain the present invention first that all it is assumed that the aggregation means AM of the aggregation module AMD that is coupled to social network platform or forms part of such social network platform, collects a plurality of social network messages that originate from said plurality of social network applications SNA1, . . . , SNAx. These collected messages are stored, in an aggregated network content data base ANCDB. The aggregating module is in charge of collecting the content coming from social networks (such as twitter, facebook, engage, jive, etc.) based on user configuration/interests. This module aggregates the content of different heterogeneous social networks. It manages the identification, registration, collect based on user configuration/inputs (e.g. user account id, user configuration, . . . ) and manages/optimizes also the social network constraints (e.g. limitation of requests, . . . ).

In the mean time while the aggregation means AM collects all messages exchanged and the database is filled with social network content, the topic determination means TDM determines, at least one set of messages having at least a certain degree of similarity from this plurality of said social network messages, maintained by the aggregated network content Database ANCDB, by comparing each message $M_1$ with each further message $M_2, \ldots, M_x$ of said plurality of messages by means of joint complexity algorithm.

Figure 4:
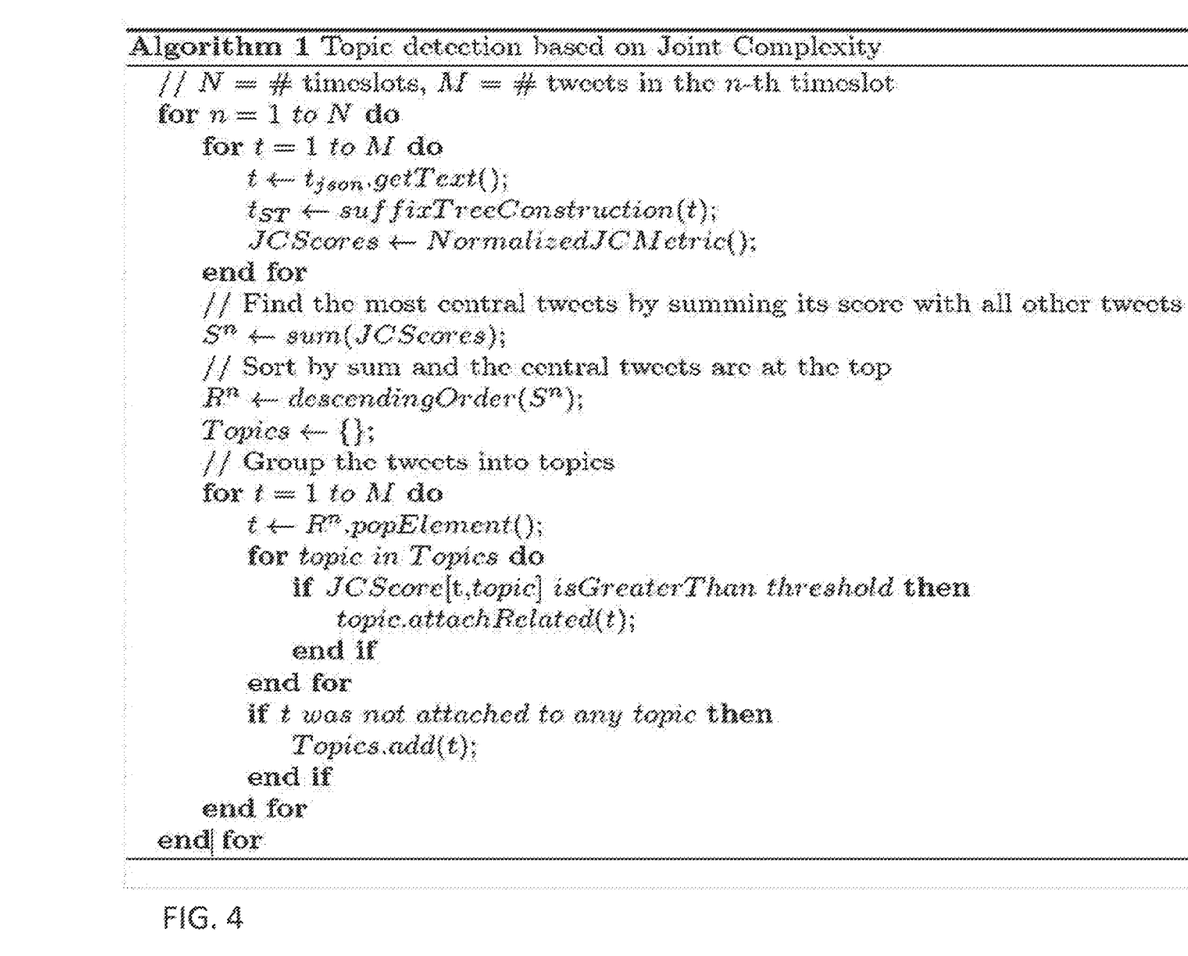
FIG. 4 represents an example of algorithm used to compare first and second messages and to extract common topics.

For each message a second and further message are compared to this first message and at first it is determined how many common factors there are available between this first and second message. The number of common factors is the joint complexity of these two messages. Subsequently this is comparison with the first message $M_1$ is performed for each further message $M_2, \ldots, M_x$. The messages, i.e. second $M_2$, and further $M_3, \ldots, M_x$ which have a similar number of common factors, i.e. having a similar joint complexity are added to a set of messages having a similar joint complexity. In the end, the comparison of common factors is performed between each message $M_1, \ldots, M_x$ of the plurality of messages maintained by the aggregated network content Database ANCDB. The joint complexity algorithm is shown in FIG. 4: Algorithm 1.

Additionally, the extracting means TEM of the network apparatus NA may extract a topic from the plurality of social network messages originating from said plurality of social network applications SNA1, . . . , SNAx included in the set of messages having at least a certain degree of similarity. This topic is stored and presented with the determined set of messages having at least a certain degree of similarity.

Text messages are analyzed through the Joint Complexity algorithm. Topics are extracted following the algorithm presented below (Algorithm1). Once topics are extracted, a Tag cloud algorithm is applied to the set of messages owned by the topic in order to extract a representation of the topic which is understandable by a user.

The tag cloud analysis is used to have a human understandable representation/view of the different topics created by the Joint Complexity analysis. The Joint Complexity algorithm determines the different topics (sets of messages) on which we apply a basic tag cloud a lgo to have a human understandable view. Alternatively the common factors between each of the messages can be determined by means of alternatives algorithms, which are less efficient than the described methods, such as Lexical analysis, Latent Semantic Analysis, Lesk algorithms.

Figure 3:
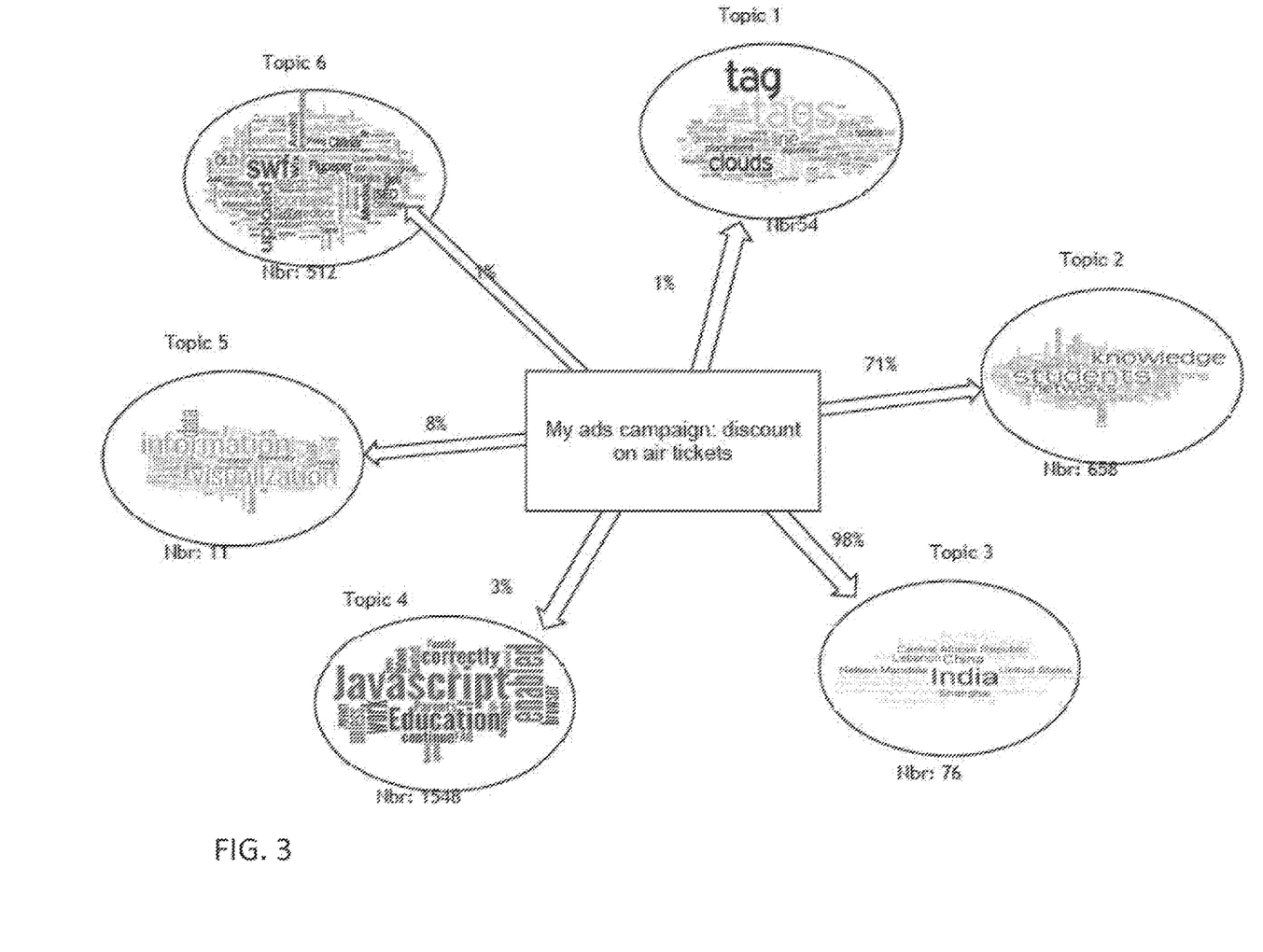
FIG. 3 represents the representation of sets of first messages with their corresponding topic and representation of relevance of second message to the corresponding topic.

FIG. 3, as an example presents a diagram with 6 sets of messages each containing messages with at least a certain degree of similarity where each outer circle represents the messages included in a respective set of messages. The amount of messages is indicated for each of the respective sets of messages. Additionally, each circle represents a cloud tag that correspond to the extracted topic (topic 1, topic 2, . . . , topic 6).

The second message determination means SMDM, subsequently determines a second certain degree of similarity between messages of a set of messages having a certain degree of similarity as determined by the topic determination means TDM from this plurality of said social network messages, where these message of the set of messages belong to a similar topic, and a second, e.g. advertisement, message of a plurality of second (advertisement) messages based on said degree of similarity between respective suffix trees corresponding to each message of said second messages. The second message determination means SMDM determines this degree of similarity between respective suffix trees corresponding to each message of said second messages also by means of the joint complexity algorithm.

When the advertiser provides its messages, the percentage of matching between its messages and topics available in the platform is provided (see FIG. 3: in the meant campaign of the advertiser being "discount on air tickets", Topic 2 and Topic 3 appear to be the best match, as they have the highest similarity). All this data is transmitted to an advertiser front-end means being configured to display. This means further is configured to implement an auction mechanism to sell the campaign. This action mechanism may be based on the GSP (Generalized second Price) algorithm. The module provides also relevant information for the advertising regarding the number of screens that will be reached by the campaign.

The comparison is made following a formula taking into account, number of message, percentage of matching, number of auctioneers, number of screen on which the message will be displayed. More the ads message matches a topic and more the number of messages in this topic is high, and more the number of screen on which the message will be displayed is high, more the price to push the ads is high. The GSP is applied between advertisers who want to send ads on the same group of user/topic.

Additionally, the extracting means TEM of the network apparatus NA may extract a topic from the plurality of social network messages originating from said plurality of social network applications SNA1, . . . , SNAx included in the set of messages having at least a certain degree of similarity. This topic is stored and presented with the determined set of messages having at least a certain degree of similarity.

The network apparatus NA further may comprise means configured to store the collected social network content collected by the aggregation means. The aggregation module feed the feeds the database, i.e. the aggregated network content database ACNDB.

The network apparatus NA further may comprise additional means:

The advertiser front-end is the interface of management proposed to the "advertiser" for presenting the results of the topic analysis, measuring the relevance of the topic with the ads messages and proposing the auction service. This front-end could be a software library that could be included in a generic way in an application or service.

An advertisements stream management means is configured to manage the dispatch of the ads messages according to certain criteria defined by the advertiser (for instance: number of times the message has to be displayed, period of the advertising campaign, . . . ) and criteria defined by the platform owner (for instance: ads messages should not represent more the 2% of displayed messages, no more than X messages per hour or quantity of displayed messages). A policy rule engine could be used to define this render policy. The main objective of this sub-component is to avoid the overflow of ads on the end-user screen.

This embodiment of the present invention enables to smartly display advertising contents on user screens or applications based on an algorithm that is language agnostic, that does not require humans to deal with list of keywords and that has high algorithmic efficiency. A sender of second messages, in case of advertisements, the advertiser will have the guarantee to have the most efficient campaign through a perfect matching between its ads messages and topics discussions/exchanges done in social networks and displayed on user screens.

Further, it is to be noted that although the embodiment describes a client-server architecture wherein the present invention is implemented and executed, this also could have been implemented and executed in a peer-to-peer architecture, cloud architecture, hardware architecture, and each other form in between.

The various means of the system can be located in a central way or in a more distributed manner, where these means may be distributed over the client devices and an optional server device.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. A method for online inserting messages in at least one social network content application of a plurality of social network content applications of at least one social network platform, the method comprising:
   collecting a plurality of social network messages originating from the plurality of social network content applications;
   determining a set of messages having a certain degree of similarity from the plurality of social network messages, by comparing at least one social network message with at least one further social network message of the plurality of social network messages;
   extracting a topic from the plurality of social network messages originating from the plurality of social network content applications included in the set of messages having at least the certain degree of similarity; and
   determining a second certain degree of similarity between the topic and a second message of a plurality of second messages based on a degree of similarity between respective at least one suffix tree corresponding to at least one second message of the plurality of second messages.

2. The method of claim 1, wherein determining the set of messages having the certain degree of similarity from the plurality of social network messages is based on use of a joint complexity approach based on common factors of messages configured to indicate degree of similarity.

3. The method of claim 1, wherein extracting the topic comprises:
   constructing suffix trees of at least a portion of the social network messages;
   computing a similarity matrix of the social network messages by counting a number of common factors among at least a portion of the pairs of the suffix trees of the social network messages; and
   aggregating, based on a threshold below which messages are not considered similar, the social network messages to form the topic.

4. The method of claim 1, further comprising:
   determining, based on tag cloud analysis using the social network messages associated with the topic, a human understandable representation of the topic.

5. The method of claim 1, further comprising:
   presenting the second message of the plurality of second messages in at least one of the plurality of social network content applications.

6. The method of claim 1, wherein the plurality of social network messages includes textual communications from or toward the social network content applications, wherein the second message comprises at least one of an advertisement, a user help message, or a user assistance message.

7. An apparatus configured for online inserting messages in at least one social network content application of a plurality of social network content applications of at least one social network platform, the apparatus comprising:
   at least one processor; and
   at least one memory including computer program code;

wherein the at least one memory and the computer program code are configured to, with the at least one processor, cause the apparatus to at least:

collect a plurality of social network messages originating from the plurality of social network content applications;

determine a set of messages having a certain degree of similarity from the plurality of social network messages, by comparing at least one social network message with at least one further social network message of the plurality of social network messages;

extract a topic from the plurality of social network messages originating from the plurality of social network content applications included in the set of messages having at least the certain degree of similarity; and determine a second certain degree of similarity between the topic and a second message of a plurality of second messages based on a degree of similarity between respective at least one suffix tree corresponding to at least one second message of the plurality of second messages.

8. The apparatus of claim 7, wherein determination of the set of messages having the certain degree of similarity from the plurality of social network messages is based on use of a joint complexity approach based on common factors of messages configured to indicate degree of similarity.

9. The apparatus of claim 7, wherein, to extract the topic, the at least one memory and the computer program code are configured to, with the at least one processor, cause the apparatus to at least:

construct suffix trees of at least a portion of the social network messages;

compute a similarity matrix of the social network messages by counting a number of common factors among at least a portion of the pairs of the suffix trees of the social network messages; and aggregate, based on a threshold below which messages are not considered similar, the social network messages to form the topic.

10. The apparatus of claim 7, wherein the at least one memory and the computer program code are configured to, with the at least one processor, cause the apparatus to at least:

determine, based on tag cloud analysis using the social network messages associated with the topic, a human understandable representation of the topic.

11. The apparatus of claim 7, wherein the at least one memory and the computer program code are configured to, with the at least one processor, cause the apparatus to at least:

present the second message of the plurality of second messages in the at least one of plurality of social network content applications.

12. The apparatus of claim 7, wherein the plurality of social network messages includes textual communications from or toward the plurality of social network content applications, wherein the second message comprises at least one of an advertisement, a user help message, or a user assistance message.

13. A non-transitory computer readable medium including instructions configured to cause an apparatus to online insert messages in at least one social network content application of a plurality of social network content applications of at least one social network platform, the non-transitory computer readable medium including instructions configured to cause the apparatus to at least:

collect a plurality of social network messages originating from the plurality of social network content applications;

determine a set of messages having a certain degree of similarity from the plurality of social network messages, by comparing at least one social network message with at least one further social network message of the plurality of social network messages;

extract a topic from the plurality of social network messages originating from the plurality of social network content applications included in the set of messages having at least the certain degree of similarity; and determine a second certain degree of similarity between the topic and a second message of a plurality of second messages based on a degree of similarity between respective at least one suffix tree corresponding to at least one second message of the plurality of second messages.

14. The non-transitory computer readable storage medium of claim 13, wherein determination of the set of messages having the certain degree of similarity from the plurality of social network messages is based on use of a joint complexity approach based on common factors of messages configured to indicate degree of similarity.

15. The non-transitory computer readable storage medium of claim 13, wherein, to extract the topic, the non-transitory computer readable storage medium includes instructions configured to cause the apparatus to at least:

construct suffix trees of at least a portion of the social network messages;

compute a similarity matrix of the social network messages by counting a number of common factors among at least a portion of the pairs of the suffix trees of the social network messages; and aggregate, based on a threshold below which messages are not considered similar, the social network messages to form the topic.

16. The non-transitory computer readable storage medium of claim 13, wherein the non-transitory computer readable storage medium includes instructions configured to cause the apparatus to at least:

determine, based on tag cloud analysis using the social network messages associated with the topic, a human understandable representation of the topic.

17. The non-transitory computer readable storage medium of claim 13, wherein the non-transitory computer readable storage medium includes instructions configured to cause the apparatus to at least:

present the second message of the plurality of second messages in at least one of the plurality of social network content applications.

18. The non-transitory computer readable storage medium of claim 13, wherein the plurality of social network messages includes textual communications from or toward the plurality of social network content applications, wherein the second message comprises at least one of an advertisement, a user help message, or a user assistance message.

\* \* \* \* \*